United States Patent [19]
Köhler et al.

[11] Patent Number: 5,718,755
[45] Date of Patent: Feb. 17, 1998

[54] PREPARATION AND USE OF IRON OXIDE BLACK PIGMENT GRANULES

[75] Inventors: Berndt-Ullrich Köhler, Lauro De Freitas, Brazil; Manfred Eitel, Kempen, Germany; Günter Linde; Herbert Kunstmann, both of Krefeld, Germany

[73] Assignee: Bayer AG, Leverkusen, Germany

[21] Appl. No.: 763,066

[22] Filed: Dec. 10, 1996

[30] Foreign Application Priority Data

Dec. 22, 1995 [DE] Germany .......... 195 48 418.5

[51] Int. Cl.⁶ .................. C09C 3/00; C09C 1/24
[52] U.S. Cl. .......... 106/456; 106/457; 106/459; 106/635; 252/62.56; 423/632; 423/634
[58] Field of Search .................. 106/456, 457, 106/459, 635; 252/62.56; 423/634, 632

[56] References Cited

U.S. PATENT DOCUMENTS

| | | |
|---|---|---|
| 3,843,380 | 10/1974 | Beyn . |
| 4,946,505 | 8/1990 | Jungk . |
| 5,002,609 | 3/1991 | Rademachers et al. ............ 106/456 |
| 5,013,365 | 5/1991 | Rademachers et al. ............ 106/456 |
| 5,322,563 | 6/1994 | von Benn et al. . |

FOREIGN PATENT DOCUMENTS

| | | |
|---|---|---|
| 3 619 363 | 6/1986 | Germany . |
| 3 910 779 | 4/1989 | Germany . |

OTHER PUBLICATIONS

Ullmann's Encyclopedia of Industrial Chemistry, 5th edition, vol. A20, pp. 297–304, VCH Verlagsgesellschaft mbH, Weinheim, 1992 (no month).

*Primary Examiner*—Michael Marcheschi
*Attorney, Agent, or Firm*—Connolly and Hutz

[57] ABSTRACT

The present invention relates to a process for the preparation of iron oxide black pigment granules which are stable to handling.

10 Claims, No Drawings

PREPARATION AND USE OF IRON OXIDE BLACK PIGMENT GRANULES

The present invention relates to a process for the preparation of iron oxide black pigment granules which are stable to handling.

Iron oxide black pigments comprise oxides of divalent and trivalent iron having magnetite structure. They are prepared either from iron(II) salt solutions by the single-phase or two-phase precipitation process or by the Laux process by nitrobenzene reduction with metallic iron (Ullmann's Encyclopedia of Industrial Chemistry, 5th edition, Vol. A20, p. 297–304, VCH Verlagsgesellschaft mbH, Weinheim, 1992). The iron oxide black pigments, which during production arise as intermediate products in aqueous phase in the form of filter cakes, are conventionally ground, after drying, to a fineness which depends on their use. Thus the iron oxide black pigments used for colouring lacquers or synthetic resins must undergo more intensive grinding than those used for colouring concrete. The latter are ground only moderately to a pigment powder.

Although iron oxide black pigments are generally utilised in this powder form, there are disadvantages to these powders, because they tend to form dust and they are difficult to dispense.

The conventional processes for preparing dust-free pellets, for example by way of pan granulators or by atomising in spray dryers, are successful in the case of iron oxide black pigments only if the granule formation is carded out with the addition of sizeable quantities of binders, since the granules are otherwise deficient in terms of strength, and they disintegrate readily. The addition of binders can in turn lead to considerable disadvantages. Depending on the type and quantity of binder, it may cause the proportion of water-soluble constituents in the granules to increase beyond the desired level, such that these pigment granules can no longer be utilised universally. On the other hand, when binders are utilised in sizeable quantities, their binding power impairs the dispersing property of the pigment.

DE-A 3 619 363, for example, proposes the use in concrete colouring of pigment granules to which dispersing aids have been added. It must be said that this addition can lead to an undesirable further increase in the quantity of water-soluble salts, which is already high because of the addition of binder.

DE-A 3 910 779 discloses carrying out granulation without the addition of binder, and achieving the necessary pellet strength by tempering at high temperature (from 400° to 800° C.). It has, however, emerged that there are disadvantages to this procedure. Firstly, the low strength of the granules before tempering leads to handling problems in the conveying and "handling" steps between granulation and tempering. It has furthermore emerged that it is necessary to adjust a very high temperature (from 600° to 800° C.) during tempering in order to prepare granules which are stable to handling, and that very precise adjustment is necessary in order to produce solid granules while avoiding sintering the pigment particles. A further disadvantage of this process is the need to work under mildly oxidising conditions if the $Fe^{3+}/Fe^{2+}$ ratio is to be kept close to 2 at the high temperatures. This is in turn desirable because with markedly lower ratios the products are not stable to oxidation. Precise adjustment of the atmosphere is particularly demanding and is moreover highly dependent on the adjustments of the other temperature parameters and on the type of product. It has furthermore emerged that it is not always possible simultaneously to adjust the strength, dispersibility and stability to oxidation to the respective desired level by varying the single available parameter of temperature during tempering.

The object of the present invention was therefore to provide a process which enables stable, universally utilisable iron oxide black pigment granules to be prepared which exhibit none of the above disadvantages.

This object was achieved by the process according to the invention, in which small quantities of binder are added to aqueous $Fe_3O_4$ suspensions which are then atomised or sprayed and are then tempered at low temperatures.

The present invention provides a process for the preparation of intensely coloured iron oxide black pigment granules which are stable to handling and are highly dispersible, which is characterised in that there are added to an $Fe_3O_4$ suspension prepared by known processes 0.1 to 1.6 wt. % binders, calculated on the iron oxide present in the suspension, the latter suspension is then dried and granulated by atomising or spraying or by other suitable measures, and the granules thus obtained are subsequently tempered at temperatures of from 80° to 650° C. in a mildly reducing, inert or mildly oxidising atmosphere.

The binder is preferably added in a quantity of from 0.1 to 1.1 wt. %, particularly preferably from 0.1 to 0.6 wt. %.

Tempering takes place preferably at from 200° to 500° C. The iron oxide black pigment suspension utilised is preferably obtained by the nitrobenzene reduction process. The iron oxide black pigment utilised may also result from the so-called precipitation process.

Tempering takes place preferably in a directly or indirectly heated rotary kiln. It may, however, also take place in a hot gas spray reactor or in a fluidised bed reactor.

The dried iron oxide black pigment granules preferably exhibit a solids content of from 70 to 99.8 wt. %, in particular from 70 to 98 wt. %, before tempering.

If tempering takes place under mildly oxidising conditions, the gases supplied during tempering preferably contain 8% oxygen.

Mildly reducing conditions are, for example, obtained by tempering at temperatures below 650° C. with gases supplied during the tempering which contain no oxygen and a slight amount of carbon monoxide. These gases can be obtained, for example, by under stoichiometric burning of natural gas.

Examples of preferred binders are soluble phosphates, silicates and sulphates.

Granules having high strength, dispersibility and stability to oxidation can be obtained by the process according to the invention, in particular by the addition of small quantities of binder and tempering at moderate temperatures. It is not necessary to adjust the tempering temperature precisely. The atmosphere during tempering may be mildly oxidising, neutral or mildly reducing.

The granules prepared by the process according to the invention may be used to colour inorganic or organic dispersions and building materials.

The invention is explained in greater detail with the aid of the Examples below.

The determination methods described in the Examples were performed as follows:

colorimetric determination of colour differences to DIN 6174 (CIELAB values) in baryte.

chroma to DIN 55 986; bleach test using five times the quantity by weight of the $TiO_2$ pigment Bayertitan® R-KB 2; binder: Alkydal® L 64 lacquer (both commercial products ex Bayer AG); co-ordination criterion=lightness.

stability to oxidation: 1 liter product is filled into a 10 cm phosphor bronze wire mesh cube, placed in the centre of a laboratory kiln with internal air circulation, heated to test temperature and held at this temperature for 24 h. If the temperature inside the sample exceeds 200° C., the sample is not stable at the selected test temperature.

dispersibility: 3 wt. % pigment are mixed into a slightly moistened concrete roofing tile mixture and compressed at a pressure of 10 bar. The product is then hardened at 35° C. for 24 hours at a relative atmospheric humidity of 90%. The chroma is now compared with that of an identically treated standard, with the co-ordination criterion being the lightness.

strength: in a rotating vessel fitted with baffles, a 20 l/min air current is impinged on 100 g pigment for 5 minutes. The air is removed through a filter and the quantity of solids remaining on the filter is weighed. This procedure is repeated five times; the individual pigment quantities are noted as well as the total.

EXAMPLES

Comparative Example 1

Washed iron oxide black pigment pastes having solids contents of from 40 to 70 wt. % were utilised as the starting material. Between 0.5 and 2 wt. %, calculated on iron oxide, of $P_2O_5$ and/or $SiO_2$ from sodium tripolyphosphate or sodium water glass were, respectively, added to these suspensions, with gentle stirring at ambient temperature, followed by spray-drying. The spray-drying was carried out in a co-current nozzle spray drier having a 1.1 mm diameter hollow-cone nozzle of the 100 type with a 25° spraying angle. The gas entry temperatures were between 400° and 530° C., the discharge temperature was adjusted such that residual moisture levels of from 1 to 6% were obtained. This gave discharge temperatures of from 80° to 140° C. The granules were not subjected to a tempering step.

The freshly prepared products were subjected to the conventional tests for chromaticity (CIELAB system), strength (dust meter with additional baffles), dispersibility (chroma development in a cement roofing tile mixture), stability to oxidation and $Fe^{3+}/Fe^{2+}$ ratio. The values obtained can be seen in Table 1.

Comparative Example 2

Pellets were prepared by the process described in Comparative Example 1 and were then tempered in an indirectly heated rotary kiln at temperatures above 650° C. in an inert ($N_2$) or a mildly oxidising ($N_2$/air) atmosphere for approx. 30 to 60 minutes. Furthermore, throughput of the gases supplied was co-current with or countercurrent to the direction of motion of the product. It was found in this case that using the co-current method resulted in almost complete combustion/decomposition of any organic residues present, while the product properties, however, remained substantially unchanged as compared with the counter-current method.

The product properties were determined as described in Comparative Example 1 and are shown in Table 1.

Comparative Example 3

Pellets were prepared by the process described in Comparative Example 1 with the addition of from 1.6% to 2% $P_2O_5$, and were then tempered in an indirectly heated rotary kiln at temperatures below 650° C. in an inert ($N_2$) or a mildly oxidising ($N_2$/air) atmosphere for approx. 30 to 60 minutes.

The product properties were determined as described in Comparative Example 1 and are shown in Table 1.

Example 4

Pellets were prepared by the process described in Comparative Example 1 with the addition of from 0.5% to 1.5% $P_2O_5$, and were then tempered in an indirectly heated rotary kiln at temperatures below 650° C. in an inert ($N_2$) atmosphere for approx. 30 to 60 minutes.

The product properties were determined as described in Comparative Example 1 and are shown in Table 1.

TABLE 1

Properties of the products obtained in Examples 1 to 4

| Ex. No. | $P_2O_5$ $SiO_2$ [wt.-%] | Temp. [°C.] | Dispersibility (chroma rel. %) | Strength (mg abrasion) | Chromaticity chroma rel. (%) | b* | Stability to oxidation; stable at [°C.] | $Fe^{3+}/Fe^{2+}$ |
|---|---|---|---|---|---|---|---|---|
| 1 | 2   | — | 98  | —   | 75  | −1.1 | 120 | 2.23 |
| 1 | 2   | — | 100 | —   | 90  | −1.4 | 120 | 2.10 |
| 1 | 2   | — | 101 | —   | —   | —    | 130 | 2.26 |
| 1 | 2   | — | 102 | —   | —   | —    | 120 | 2.22 |
| 1 | 2   | — | 104 | 395 | 97  | −1.6 | 130 | 1.96 |
| 1 | 1,5 | — | 96  | —   | 97  | −1.3 | 120 | 2.00 |
| 1 | 1,0 | — | 101 | —   | 97  | −1.4 | 120 | 1.98 |
| 1 | 0,5 | — | 103 | —   | 103 | −1.0 | 110 | 2.23 |
| 2 | 2   | 700 | 16 | —   | 71  | −3.6 | 170 | 1.4  |
| 2* | 2  | 700 | 14 | —   | 61  | −3.8 | 180 | 2.26 |
| 2 | 1   | 700 | 42 | —   | 75  | −3.1 | 160 | 1.53 |
| 3* | 2  | 400 | 47 | —   | 74  | −2.0 | 160 | 2.36 |
| 3* | 2  | 450 | 47 | —   | 73  | −2.3 | 160 | 2.29 |
| 3* | 2  | 500 | 47 | —   | 81  | −2.5 | 160 | 2.23 |
| 3 | 2   | 200 | 51 | —   | 95  | −1.9 | 160 | 1.97 |
| 3 | 2   | 370 | 38 | —   | 93  | −2.2 | —   | 1.84 |
| 3 | 2   | 420 | 30 | —   | 94  | −2.4 | 160 | 1.85 |
| 3 | 2   | 460 | 30 | —   | 91  | −2.6 | —   | 1.67 |
| 3 | 2   | 500 | 28 | —   | 91  | −2.6 | —   | 1.58 |

TABLE 1-continued

Properties of the products obtained in Examples 1 to 4

| Ex. No. | $P_2O_5$ $SiO_2$ [wt.-%] | Temp. [°C.] | Dispersibility (chroma rel. %) | Strength (mg abrasion) | Chromaticity chroma rel. (%) | b* | Stability to oxidation; stable at [°C.] | $Fe^{3+}/Fe^{2+}$ |
|---|---|---|---|---|---|---|---|---|
| 3  | 2   | 600 | 26  | —   | 90 | −3.3 | —   | 1.49 |
| 3* | 2   | 370 | 23  | —   | —  | —    | 160 | 2.1  |
| 4  | 1,5 | 200 | 87  | —   | 87 | −1.4 | 150 | 2.2  |
| 4  | 1,5 | 400 | 88  | —   | 87 | −2.1 | 160 | 2.0  |
| 4  | 1,0 | 200 | 100 | —   | 92 | −1.2 | 150 | 2.2  |
| 4  | 1,0 | 400 | 103 | —   | 98 | −1.8 | 150 | 1.9  |
| 4  | 1,0 | 500 | 101 | —   | —  | —    | 160 | —    |
| 4  | 1,0 | 600 | 98  | —   | —  | —    | 160 | —    |
| 4  | 0,5 | 200 | 122 | 280 | 91 | −0.7 | 150 | 2.4  |
| 4  | 0,5 | 370 | —   | 235 | 98 | −1.4 | 140 | 2.1  |
| 4  | 0,5 | 430 | 125 | 230 | 96 | −1.4 | 150 | 2.0  |

*Tempered under mildly oxidising conditions; inert conditions apply to other tests.

Bayferrox® 330 (commercial iron oxide product of Bayer AG, Leverkusen, Germany) was utilised as a control when testing dispersibility and chromaticities.

Despite the good dispersibility and chromaticities of the products from Comparative Example 1, stability to oxidation is inadequate.

The products from Comparative Examples 2 and 3 are barely dispersible.

What is claimed is:

1. A process for the preparation of intensely colored iron oxide black pigment granules, which are stable to handling and are highly dispersible, comprising the steps of:
   (a) adding about 0.1 to about 1.6 wt % binders comprising soluble phosphates, silicates or sulfates to an $Fe_3O_4$ suspension, wherein the binder wt % is calculated based on the iron oxide present in the suspension;
   (b) drying and granulating the suspension by atomizing or spraying to form dried iron oxide black pigment granules having a solids content of about 70 to 90 wt %; and
   (c) tempering the granules at a temperature of 200°–500° C.

2. A process according to claim 1 wherein the binder is added in an amount ranging from about 0.1 to about 1.1 wt. %.

3. A process according to claim 1 wherein the binder is added in an amount ranging from about 0.1 to about 0.6 wt. %.

4. A process according to claim 1 wherein the $Fe_3O_4$ suspension is prepared from a nitrobenzene reduction process.

5. A process according to claim 1 wherein the tempering is carried out in a directly or indirectly heated rotary furnace.

6. A process according to claim 2 wherein the tempering is carried out in a directly or indirectly heated rotary furnace.

7. Intensely colored iron oxide black pigment granules prepared by the process of claim 1.

8. A process as claimed in claim 1, wherein the tempering is carried out in a reducing atmosphere.

9. A process as claimed in claim 1, wherein the tempering is carried out in an inert atmosphere.

10. A process as claimed in claim 1, wherein the tempering is carried out in an oxidizing atmosphere.

* * * * *